United States Patent [19]

DeLaTorre et al.

[11] 4,102,852
[45] Jul. 25, 1978

[54] SELF-EXTINGUISHING ROOM TEMPERATURE VULCANIZABLE SILICONE RUBBER COMPOSITIONS

[75] Inventors: Pearline DeLaTorre, Elnora; Melvin D. Beers, Schenectady, both of N.Y.

[73] Assignee: General Electric Company, Waterford, N.Y.

[21] Appl. No.: 780,379

[22] Filed: Mar. 23, 1977

[51] Int. Cl.$^2$ ............................................. C08L 83/04
[52] U.S. Cl. ........................ 260/37 SB; 260/DIG. 24
[58] Field of Search ................................... 260/37 SB

[56] References Cited

U.S. PATENT DOCUMENTS

| | | | |
|---|---|---|---|
| 3,635,874 | 1/1972 | Laur et al. | 260/37 SB |
| 3,734,881 | 5/1973 | Shingledecker | 260/37 SB |
| 3,779,986 | 12/1973 | Smith et al. | 260/37 SB |
| 3,872,054 | 3/1975 | Shaw | 260/37 SB |

OTHER PUBLICATIONS

Noll; Chemistry and Technology of Silicones; 1968 Academic Press; p. 389.

*Primary Examiner*—Lewis T. Jacobs
*Attorney, Agent, or Firm*—E. Philip Koltos; John L. Young; Frank L. Neuhauser

[57] ABSTRACT

A self-extinguishing room temperature vulcanizable silicone rubber composition comprising a silanol endstopped diorganopolysiloxane polymer, a metal oxide filler, an alkoxy functional cross-linking agent, carbon black, platinum and a titanium chelate catalyst. For the optimum self-extinguishing one-component room temperature vulcanizable silicone rubber composition within the scope of the present invention, it is preferred that there be from 0.5 to 20 mole percent of phenyl content based on the base polysiloxane polymer and from .01 to 10 mole percent vinyl content based on the base polysiloxane polymer.

28 Claims, No Drawings

SELF-EXTINGUISHING ROOM TEMPERATURE VULCANIZABLE SILICONE RUBBER COMPOSITIONS

BACKGROUND OF THE INVENTION

The present invention relates to a silicone rubber composition and more particularly the present invention relates to a one component self-extinguishing room temperature vulcanizable silicone rubber composition.

At the present time there has been a large emphasis made in the industry to obtain flame inhibitive compositions for articles that are utilized by consumers or for industrial use such as, in the fabrication of electrical components. It has been especially desirable in the construction of electrical components to utilize sealants which would be self-extinguishing and more specifically to utilize silicone sealants which are self-extinguishing. Generally, silicone compositions that cure to silicone elastomers, while being slower to catch on fire than other construction sealants, do nevertheless, when the temperature of burning exceeds a certain temperature limit burn or support combustion. Accordingly, it has been found desirable to formulate silicone materials that were self-extinguishing or would support combustion only for a limited period of time, unless, of course, the temperature went to exceptionally high limits.

One effort in this direction was as set forth in the disclosure of Noble and Brower, U.S. Pat. No. 3,514,424, that comprises the incorporation of platinum compounds in heat vulcanizable silicone rubber compositions which improved the flame inhibitive properties of heat vulcanizable silicone rubber compositions. However, such platinum additives which were effective in improving the flame retardancy of heat vulcanizable rubber compositions were not that altogether effective in improving the flame retardancy of room temperature silicone rubber compositions. Specifically, heat vulcanizable silicone rubber compositions comprise a polysiloxane gum, a filler as well as the flame retardant additive and a peroxide catalyst where the composition is heated at elevated temperatures above 100° C to produce a silicone elastomer.

Room temperature vulcanizable silicone rubber compositions are on the other hand broken down into two-component room temperature vulcanizable silicone rubber compositions and one-component room temperature vulcanizable silicone rubber compositions. The two-component system is distinguished from the one-component in that other than the difference in ingredients, the two-component system cures upon mixing the two-components in situ at room temperature either in the presence or absence of atmospheric moisture to produce a silicone elastomer that is fully cured within 24 hours. The one-component room temperature vulcanizable silicone rubber composition comprises a silanol polymer, a filler and a cross-linking agent selected from alkoxy functional silanes, acetoxy functional silanes, ketoximino functional silanes, amide functional silanes, amino functional silanes and other types of functional silanes as is well known in the one-component room temperature vulcanizable silicone rubber compositions prior art. One-component room temperature vulcanizable silicone rubber compositions are packaged in anhydrous state and sealed in a package such as, a caulking tube in the absence of moisture. When such composition is exposed to atmospheric moisture the cross-linking agents hydrolyze and this results in the formation of a silicone elastomer whereupon final cure does not take place for 24 to 72 hours. Such one-component room temperature vulcanizable silicone rubber compositions are highly desired as sealants, adhesives and encapsulating agents. Accordingly, the use of the Noble and Brower platinum additive to such one-component room temperature vulcanizable silicone rubber compositions did not markedly improve the flame retardant properties of such compositions. Another approach was to incorporate chlorinated hydrocarbon compounds in such one-component room temperature vulcanizable silicone rubber composition which chlorinated hydrocarbon compounds improved the flame inhibitiveness of such cured silicone elastomers. However, undesirably when such compositions were burned at excessively high temperatures there was given off in some cases toxic by-products.

Accordingly, it was highly desirable to obtain a non-toxic self-extinguishing one-component room temperature vulcanizable silicone rubber composition. One approach to this problem is as disclosed in the Patent of Shingledecker, U.S. Pat. No. 3,734,881. In accordance with the disclosure of this patent a non-toxic self-extinguishing one-component room temperature vulcanizable silicone rubber composition is obtained by having in addition to the silanol base-polymer and the necessary fillers, a platinum compound, carbon black, a metal oxide filler such as, zinc oxide, optionally some phenyl in the base polymer and where the cross-linking agent is a vinyl-containing acetoxy functional silane or a vinyl-containing ketoxime functional silane. While such composition is a self-extinguishing one-component room temperature vulcanizable silicone rubber composition and gives off a minimum of toxic by-products upon burning, nevertheless, it does give off corrosive by-products when the cross-linking agent hydrolyzes. Accordingly, it was highly desirable to obtain for the encapsulation of electrical components a non-toxic, non-corrosive, self-extinguishing room temperature vulcanizable silicone rubber composition. However, in Column 4 of the Shingledecker U.S. Pat. No. 3,734,881, beginning with line 64, the patentee discloses that other useful moisture curable room temperature vulcanizable silicone elastomers are not made self-extinguishing by the combination of carbon black and platinum. Accordingly, it was highly unexpected to discover a self-extinguishing one-component room temperature vulcanizable silicone rubber composition which gives off a minimum of toxic by-products while burning and also does not evolve corrosive by-products during cure.

It is one object of the present invention to provide for a one-component room temperature vulcanizable silicone rubber composition which is self-extinguishing. It is another object of the present invention to provide a one-component room temperature vulcanizable silicone rubber composition which gives off a minimum of toxic by-products during burning and does not give off any corrosive by-products during its cure. It is an additional object of the present invention to provide for a process for producing a one-component room temperature vulcanizable silicone rubber composition which is self-extinguishing, gives off a minimum of toxic by-products upon burning and does not give off any corrosive by-products during cure. It is yet an additional object of the present invention to provide for a one-component room temperature vulcanizable silicone rubber composition which has an optimum combination of self-extinguishing and flame inhibitive properties. These and other objects of the present invention are accomplished by means of the disclosure set forth hereinbelow.

SUMMARY OF THE INVENTION

In accordance with the above objects there is provided by the present invention a self-extinguishing room temperature vulcanizable silicone rubber composition comprising (a) 100 parts by weight of a silanol end-stopped diorganopolysiloxane polymer having a viscosity varying from 100 to 500,000 centipoise at 25° C, where the organo groups in such polysiloxane are monovalent hydrocarbon radicals; (b) from 5 to 200 parts by weight of a filler selected from reinforcing and extending fillers; (c) from 0.1 to 10 parts by weight of a metal oxide filler which is preferably, zinc oxide; (d) from 1 to 15 parts by weight of a cross-linking agent having the formula,

$$R Si (OR^1)_3 \quad (1)$$

where R and $R^1$ are monovalent hydrocarbon radicals; (e) from 0.5 to 10 parts by weight of carbon black; (f) from 1 to 100 parts per million of platinum, either in the solid form and more preferably in the form of a platinum complex, and (g) from 0.1 to 5 parts of a titanium chelate catalyst wherein also the composition contains from 0.01 to 10 mole percent of vinyl unsaturation based on the base polymer. It should be noted in the foregoing Shingledecker U.S. Pat. No. 3,734,881, set forth hereinabove, there is disclosed that no catalyst is necessary to cure the composition and a catalyst, if used, should be checked carefully. In the instant composition in which an alkoxy functional cross-linking agent is utilized, a titanium chelate catalyst is necessary if the cure of the composition is not to be unduly prolonged. The composition does not lose any of its self-extinguishing properties by reasons of the presence of the titanium chelate catalyst. To optimize the self-extinguishing properties of the composition there should preferably be present some phenyl in the silanol end-stopped base organopolysiloxane fluid or such phenyl content can be introduced into the composition through the use of a low viscosity phenyl-containing oil. At any rate, such phenyl content based on the base polymer varying from 0.5 to 20 mole percent of phenyl substituent groups. If there is utilized a phenyl-containing oil in addition to the base silanol end-stopped polysiloxane polymer then it is preferred that such additional phenyl-containing oil contain 0.5 to 40 mole percent of phenyl substituent groups. The composition must also contain some vinyl unsaturation. Such vinyl unsaturation can be preferably introduced in the cross-linking agent by having the R substituent group in the alkoxyfunctional cross-linking agent be selected from vinyl. As an alternative the base silanol material can contain anywhere from 0.01 to 10 mole percent of vinyl concentration.

It should be noted that the basic flame retardant ingredients in the base composition are the metal oxide fillers which are preferably, zinc oxide, platinum and the carbon black, and that in addition for optimum flame retardancy first, there must be present a certain amount of vinyl unsaturation in the composition and in the second instance for further improving the self-extinguishing properties of the composition there should be present a certain amount of phenyl content as specified above. Such a composition is both self-extinguishing, gives off a limited amount of toxic by-products during burning and gives off non-corrosive by-products during cure.

It should be emphasized that the vinyl unsaturation, as well as the phenyl content in the composition may be present either through introduction through the silanol end-stopped base fluid or through the addition of various vinyl-containing resins or phenyl-containing low viscosity oils into the composition. The composition may have any other additional additives that do not interfere with the self-extinguishing properties of the compositions such as, silyl isocyanurate self bonding additives which produce a self-bonding, self-extinguishing one-component room temperature vulcanizable silicone rubber composition. As noted, other type of additives may be added to the composition to impart certain desired properties in the one-component system as long as they do not detract from the self-extinguishing characteristics of the composition.

DESCRIPTION OF THE PREFERRED EMBODIMENT

It should be pointed out that the present composition is non-corrosive and in fact meets Military Specification 46-146 for non-corrosiveness and as such is eminently suitable for the encapsulation of electrical components, wherein it is desired that the composition not give off corrosive by-products which would corrode or degrade any electrical wires in the part that is encapsulated.

The basic ingredient in the one-component room temperature vulcanizable silicone rubber system of the instant invention comprises 100 parts of a silanol end-stopped diorganopolysiloxane polymer generally having a viscosity varying anywhere from 100 to 500,000 centipoise at 25° C and more preferably having a viscosity varying from 1,000 to 200,000 centipoise at 25° C. The organo groups can be any organic groups usually found in silanol end-stopped polymers as defined above and as such could be monovalent hydrocarbon radicals, such as, alkyl radicals, for instance, methyl, ethyl, propyl and etc.; alkenyl radicals such as, vinyl, allyl and etc.; cycloalkyl radicals such as, cyclohexyl, cycloheptyl and etc., and mononuclear aryl radicals such as, phenyl, methylphenyl, ethylphenyl and etc. More preferably, in such a polymer there can be up to 10 mole percent of monofunctional siloxy units and trifunctional siloxy units. Most preferably such monofunctional and trifunctional siloxy units are present only in trace amounts, such that generally the silanol end-stopped diorganopolysiloxane polymer has an organo to Si ratio varying anywhere from 1.9:2.1 to 1. Most preferably, the silanol end-stopped diorganopolysiloxane polymer has the formula,

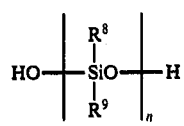

$$(2)$$

where $R^8$ and $R^9$ are selected from the class consisting of alkyl, aryl and alkenyl radicals of 1 to 8 carbon atoms wherein up to 20 mole percent of $R^8$ and $R^9$ can be aryl radicals and up to 10 mole percent of $R^8$ and $R^9$ can be alkenyl radicals and $n$ varies from 10 to 1700.

It should be noted that for optimum performance, there should be in the instant composition some phenyl substituent groups and some vinyl substituent groups.

This may be accomplished by having in the silanol end-stopped diorganopolysiloxane polymer some phenyl substitution and some vinyl substitution. However, it can also be accomplished by incorporating into the composition, as will be presently discussed, phenyl-containing oils and vinyl-containing resins or a vinyl-containing cross-linking agent. In one embodiment of the instant invention where it is desired to have the phenyl substituent units and the vinyl substituent groups in the base silanol end-stopped diorganopolysiloxane polymer there is generally preferred that there be from 0.5 to up to 20 mole percent of phenyl substituent groups in the silanol end-stopped diorganopolysiloxane polymer, as defined above, and from 0.01 to 10 mole percent of vinyl substituent groups in the silanol end-stopped diorganopolysiloxane polymer as defined above, and more preferably as defined in Formula 2. such silanol end-stopped diorganopolysiloxane polymers are well known, see for instance, U.S. Pat. No. 3,689,454, which is incorporated into the present case by reference. Such silanol end-stopped diorganopolysiloxane base polymers are prepared by first hydrolyzing diorganodichlorosilanes in water and then taking the hydrolyzate and cracking it in the presence of an alkali metal hydroxide catalyst to remove a maximum amount of the cyclictetrasiloxane product from the distillation residue. The cyclictetrasiloxanes are then equilibrated in the Presence of 50 to 500 parts per million or alkali metal hydroxide, and the appropriate amount of chain stoppers such as a silanol end-stopped organodisiloxane or in the presence of the appropriate amounts of a hydrolyzate product of a diorganodichlorosilane and an acidic catalyst such as, toluene sulfonic acid, to produce from such cyclictetrasiloxanes and from the appropriate amounts of chain stoppers the desired silanol end-stopped diorganopolysiloxane base polymer.

In another preferred embodiment the cyclictetrasiloxanes are equilibrated in the presence of an alkali metal hydroxide catalyst of 5 to 500 parts per million and also in the presence of diorganosiloxy chain stoppers where the organo groups are as defined previously, such as, hexadisiloxane and octamethyltrisiloxane or divinyltetramethyldisiloxane to produce high molecular weight linear diorganopolysiloxane gum such that a gum having the viscosity of anywhere from 500,000 centipoise to 200,000,000 centipoise at 25° C is obtained. During such equilibration procedure either with the base catalyst or the toluene sulfonic acid, after about 85% of the cyclic-tetrasiloxanes have been converted to the linear polymer there is obtained as much conversion of the cyclictetrasiloxanes to the linear polymer as there is reconversion of the linear polymer back to the cyclic-tetrasiloxanes. At this equilibration point of 85%, the equilibration reaction carried on at elevated temperatures of about 100° C is terminated, the catalyst is neutralized and the cyclics are vented off to result in the desired triorganosiloxy polysiloxane high molecular weight gum. In the case of the gum, it is necessary to then strip it with steam to produce the desired viscosity silanol end-stopped linear diorganopolysiloxane polymer.

Generally, in the preparation of such polymers there may be present up to 5 mole percent of monofunctional siloxy units and/or trifunctional siloxy units. If in the equilibration with the toluene sulfonic acid catalyst the hydrolyzate of chain-stoppers as purified contains a minimum of trifunctional siloxy units and monofunctional siloxy units, then the silanol end-stopped base diorganopolysiloxane polymer will basically have the structure as that of Formula 2 above. Also, silanol end-stopped diorganopolysiloxane base polymers will have the structure of Formula 2 above if they are prepared through the process of going through the gum first before reaching the low molecular weight diorganopolysiloxane polymer steps and such material will basically have the structure of Formula 2 above with a minimum amount of trifunctional units and monofunctional siloxy units.

In such compositions, it is also desired to have a certain amount of filler in the composition. Thus, there may be anywhere from 5 to 200 parts by weight of reinforcing or extending fillers in the composition per 100 parts of the base silanol end-stopped diorganopolysiloxane polymer. Preferably, there is present from 20 to 150 parts of such fillers selected from reinforcing and extending fillers in the instant composition. The presence of such fillers are desired in the one-component room temperature vulcanizable silicone rubber compositions of the instant case for the purpose of imparting appropriate tensile strength properties to the resulting cured elastomer that is formed from the composition. Generally, there may be present from 5 to 50 parts by weight of a reinforcing filler which is selected from fumed silica and precipitated silica and from 0 to 150 parts by weight of an extending filler. There can be present in the instant composition both reinforcing and extending fillers or there can be present just the reinforcing filler or there can be present just an extending filler, the composition being formulated to result in a cured elastomer with the desired combination of tensile strength and tear strength properties. More preferably, there may be present from 10 to 50 parts by weight of reinforcing filler and from 10 to 100 parts by weight of an extending filler. These concentrations of reinforcing and extending fillers are not critical, the concentration being picked, as stated previously, to result in a self-extinguishing silicone elastomer with the desired combination of tensile strength and tear strength properties.

The reinforcing fillers such as, fumed silica and precipitated silica are preferably pretreated with cyclic-polysiloxanes, as disclosed in Lucas, U.S. Pat. No. 2,938,009, which is hereby incorporated into the present case by reference, and specifically octamethylcyclictetrasiloxane or may be treated with silazanes or a combination of silazanes and cyclicpolysiloxanes and other treating agents as is well known in the art. Preferably, such reinforcing fillers are treated with such cyclic-polysiloxanes and/or silazanes to obtain a composition which in the cured state has the desired tensile strength and tear strength properties but in the uncured state does not have an unduly large viscosity which may be the case when the reinforcing fillers are not treated.

With respect to the extending fillers any extending fillers can be utilized such as, titanium dioxide, lithopone, silica aerogel, diatomaceous earth, calcium carbonate, glass fibers, magnesium oxide, chromic oxides, zirconium oxide, alpha quartz, calcium, clay, asbestos, carbon graphite, synthetic fibers and etc. The extending fillers may be treated with cyclictetrasiloxanes as disclosed in the foregoing Lucas patent to result in an uncured silicone elastomer which does not have an undue increase in its viscosity but which in the cured state has the proper combination of tensile strength and tear strength properties.

Along with the silanol end-stopped diorganopolysiloxane base polymer and the filler set forth in the quantities set forth above, there is preferably present a concentration of 0.1 to 10 parts by weight based on 100 parts of silanol end-stopped diorganopolysiloxane of a metal oxide filler which metal oxide filler can be zinc oxide, iron oxide and aluminum oxide in the concentrations set forth above. In the most preferred embodiment of the instant invention such metal oxide filler in the preferred ranges given above can vary at a concentration of 0.1 to 10 parts but is generally more preferred at a concentration of 0.1 to 5 parts by weight based on the silanol end-stopped diorganopolysiloxane base polymer. Most preferably, a metal oxide filler in a 0.1 to 4 parts by weight concentration is zinc oxide, the other metal oxide fillers being less preferred.

For optimum self-extinguishing properties in the instant composition there must be present from 0.1 to 5 parts by weight of the metal oxide filler which may be selected from zinc oxide, iron oxide and aluminum oxide and is most preferably zinc oxide. Above 10 parts by weight of such a metal oxide filler does not add additional self-extinguishing properties to the composition and the metal oxide filler just simply fills the function of acting as an agent in increasing the tensile strength and tear strength of the cured silicone elastomer. Such a metal oxide filler such as zinc oxide does not have to be treated in the small quantities that is utilized in the composition if it is utilized solely in those concentrations. If the metal oxide is utilized as an extending filler in the composition it may be treated so that it will not increase the viscosity of the uncured composition while at the same time it increases the tensile strength and tear strength of the cured silicone elastomer to the desired level.

Another ingredient that must be present in the one-component room temperature vulcanizable silicone rubber compostion of the present case is a cross-linking agent and specifically there must be present from 1 to 15 parts by weight of an alkoxy-functional cross-linking agent of Formula I above. More preferably, there is 1 to 10 parts by weight of the alkoxy functional cross-linking agent of Formula I above based on 100 parts of the silanol end-stopped diorganopolysiloxane polymer. In such a formula, R and $R^1$ are monovalent hydrocarbon radicals as specified above, for the organo groups of the base silanol end-stopped diorganopolysiloxane polymer. Most preferably, R and $R^1$ are selected from alkyl radicals and alkenyl radicals of 1 to 8 carbon atoms. To achieve good performance of the instant composition in behaving as a self-extinguishing composition in the cured state, it is preferred that the R radical or some portion of the R radical be vinyl, $R^1$ being methyl or ethyl.

Further, there is preferably utilized a silicone resin ingredient in the composition containing a certain amount of vinyl concentration. As stated previously, for maximum flame extinguishing performance of the instant composition a certain amount of vinyl unsaturation must be present in the basic composition. Accordingly, in the most preferred embodiment so as to provide the appropriate amount of vinyl unsaturation in the composition it is preferred that the R radical be selected from vinyl and $R^1$ be selected from methyl or ethyl. The choice of utilization of vinyl substituent groups in the composition of the instant case is left to the worker skilled in the art to obtain a self-extinguishing composition with the desired properties for a particular application. In the instant composition it is preferred that the R radical in the cross-linking agent of Formula I be vinyl and in a less preferred embodiment R can be saturated aliphatic radical such as, methyl, while the silanol end-stopped diorganopolysiloxane base polymer may contain the foregoing vinyl unsaturation or a vinyl containing resin may be added to the composition. The use of such cross-linking agent such as that of Formula I above to produce a non-corrosive one-component room temperature vulcanizable silicone rubber composition is adequately set forth in the U.S. Pat. 3,689,454, which is hereby incorporated into the present case by reference and as such an explanation thereof is not necessary.

Another self-extinguishing additive in the instant one-component room temperature vulcanizable silicone rubber composition which is present at a concentration of 0.5 to 10 parts by weight is carbon black. Such carbon black must be present in the instant composition as a flame extinguishing additive if the composition is to have the desired flame extinguishing properties. Preferably, such carbon black has a surface area of at least 5 square meters per gram and a particle of anywhere from 0.005 to 0.5 microns in size and is utilized at a concentration of 0.5 to 5 parts by weight. Carbon blacks outside of those size specifications can be utilized in the instant composition. However, such carbon blacks are undesirable since they detract from the self-extinguishing properties of the composition of the instant case. Preferably, there is utilized from 0.1 to 4 parts by weight of carbon black based on 100 parts of the silanol end-stopped diorganopolysiloxane base polymer.

The third necessary self-extinguishing additive in the compositions of the instant case is platinum, whether a solid platinum metal deposited on a solid carrier such as, gamma-alumina or a solubilized platinum complex. Generally, there may be utilized in the instant composition to obtain some self-extinguishing properties at least one part per million of platinum by weight based on the whole composition and generally from 1 to 30 parts per million by weight of platinum. If more than 100 parts per million are utilized such additional amounts of platinum do not impart additional flame extinguishing properties to the composition while at the same time, increasing the cost of the composition as a result of the additional platinum that is utilized in the composition. Accordingly, for utilization in the instant self-extinguishing composition of the instant case there may be utilized anywhere from 1 to 100 parts per million of platinum and more preferably from 1 to 30 parts per million of platinum. The preferred solubilized platinums that can be utilized are, for instance, those having the formula $(PtCl_2.Olefin)_2$ and $H(PtCl_3.Olefin)$ as described in U.S. Pat. No. 3,519,601 of Ashby. The olefin shown in the previous two formulas can be in almost any type of olefin but is preferably an alkenylene having from 2 to 8 carbon atoms, a cycloalkylene having from 5 to 7 carbon atoms or styrene. Specific olefins utilizable in the above formulas are ethylene, propylene, the various isomers of butylene, octylene, cyclopentene, cyclohexene, cycloheptene and etc. A further platinum-containing material usable in the composition of the instant invention is a platinum chloride cyclopropane complex $(PtCl_2.C_3H_6)2$ described in U.S. Pat. No. 3,159,662, Ashby. Preferably, there is utilized in the instant composition a solubilized platinum complex in the above concentration in terms of platinum such as, chloroplatinic acid, in the foregoing Ashby platinum complexes or Lamoreaux's complex disclosed in U.S. Pat. No.

3,220,972 or the Karstedt complex as disclosed in U.S. Pat. No. 3,715,334 which are hereby incorporated into the present case by reference.

The concentration of platinum given above for use in the instant composition is determined on the basis of the weight of the total composition. It should be noted here without the metal oxide filler and specifically, zinc oxide, platinum and carbon black the instant composition does not have the desired self-extinguishing properties. With these three ingredients in the instant composition, then the composition has the appropriate self-extinguishing properties. In addition to optimizing the self-extinguishing properties of the instant composition, there may be present the foregoing concentration of phenyl and vinyl as a result of the addition of various additives as will be described below or as the result of such groups being in the base polymer. Accordingly, for the present non-corrosive silicone composition to cure properly, it must have present in it from 0.1 to 5 parts by weight based on 100 parts of a silanol end-stopped base polymer of a titanium chelate catalyst. Although any titanium chelate catalyst can be utilized in the self-extinguishing composition in terms of obtaining a composition with a desired combination of tensile strength and have a rapid enough cure rate, it is desired that the titanium chelate catalyst be the one specified in U.S. Pat. No. 3,689,454, incorporated into the present case by reference.

Accordingly, as disclosed, such titanium chelate catalyst, preferably, has the formula,

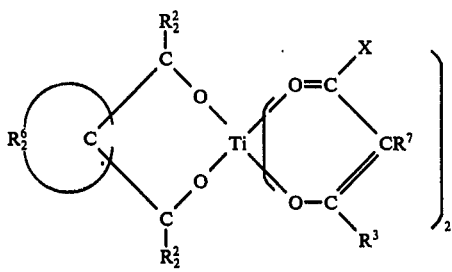

wherein $R^2$ is a radical selected from the group consisting of hydrogen, hydrocarbyl having not more than about 8 carbon atoms, carboxyalkyl and the total number of carbon atoms in the $R^2$ and $R^6$ substituted alkanedioxy radical is not more than about 18, $R^3$ is a radical having not more than about 8 carbon atoms selected from the group consisting of hydrocarbyl, and cyano lower alkyl, $R^6$ is selected from the same group as $R^2$, cyano, nitro, carboxyl ester and acyl, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ forms together with the carbon atoms to which they are attached cyclichydrocarbon substituents of not more than about 12 carbon atoms and nitro, acyl, cyano and carboxy ester substituted cyclichydrocarbon substituents; X is a radical selected from the class consisting of radicals having not more than about 8 carbon atoms selected from the group consisting of hydrocarbyl, cyanoalkyl, alkoxy, cyanoalkoxy and amino, o has a value of 0 to 8, and such that when o is zero the $$\begin{array}{c} R^2 \\ | \\ C \end{array}$$

moieties are bonded to each other in a cyclic fashion. It is preferred that the titanium chelate catalyst within the scope of the formula mentioned above is one having the formula,

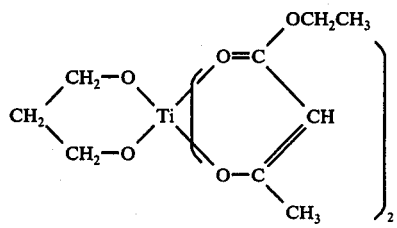

As noted above, these are the preferrred titanium chelate catalysts for utilization in the instant composition. The process for preparing such titanium chelate catalysts as well as their uses in an alkoxy functional cross-linking agent one-component room temperature vulcanizable silicone rubber composition is fully explained in the foregoing U.S. Pat. No. 3,689,454 patent and as such it is not necessary to comment thereon. However, it should be noted that for such a composition as the instant case to have the desired self-extinguishing properties it is not necessary to utilize the foregoing titanium chelate catalyst in the instant composition. Other types of titanium chelate catalysts may be used in the instant composition or such titanium chelate catalyst are catalysts which may be utilized in combination with the metal salt of carboxylic acid, although such is not preferred. In any case, the titanium chelate catalyst of the formulas shown above are preferred in the instant composition since they give the composition of the instant specification and claims the best physical properties as set forth in the foregoing U.S. Pat. No. 3,689,454. If such a catalyst is not utilized in the composition, it will still cure slowly when exposed to atmospheric moisture and the absence of such a catalyst will not affect the self-extinguishing properties and will only affect the final physical properties of the composition. As disclosed above with the foregoing titanium chelate catalyst in the composition the optimum combination of physical properties are obtained as set forth in the foregoing U.S. Pat. No. 3,689,454.

It should also be pointed out that in Formula I above, that R and $R^1$ can also be selected from the class consisting of alkyl, aryl and alkenyl radicals of 1 to 8 carbon atoms and in the most preferred embodiment R is vinyl and $R^1$ is methyl or ethyl.

In the case where the base silanol end-stopped diorganopolysiloxane polymer does not contain any phenyl substitutent groups then it is desirable for the optimum self-extinguishing properties in the composition of the instant case to introduce phenyl concentration into the polymer. Accordingly, such may be done to optimize the self-extinguishing properties of the instant composition by incorporating anywhere from 0.5 to 30 parts by weight of the base polysiloxane, a polysiloxane having a viscosity varying from 50 to 10,000 centipoise at 25° C which may have as terminal groups radicals selected from the class consisting of alkoxy radicals, alkyl radicals and alkenyl radicals of 1 to 8 carbon atoms and where the other substituent groups in the polysiloxane are selected from methyl, phenyl and vinyl, where there is present from 0.5 to 40 mole percent of phenyl groups in the polysiloxane. Such phenyl-containing fluid may be any type of phenyl-containing fluid. Preferably, it is a linear fluid or basically linear fluid that will not interfere with the other properties of the instant one-component composition, such that the organo to Si ratio in the polymer varies anywhere from 1.9 to 2.1. Such a phenyl-containing polysiloxane acts both as a diluent and also to introduce phenyl groups to the composition to increase its self-extinguishing properties. More preferably, the polysiloxane oil has a viscosity varying anywhere from 100 to 1000 centipoise at 25° C. The concentration of such polymer in the instant composition based on 100 parts of the silanol end-stopped diorganopolysiloxane base polymer will vary depending on the phenyl concentration in the polymer. It is desired that the additive that is added to the composition add the same amount of phenyl content that would be imparted to the composition if the base silanol end-stopped diorganopolysiloxane polymer of Formula 2 had a phenyl concentration varying anywhere from 0.5 to 20 mole percent and more preferably varying from 0.5 to 10 mole percent. Accordingly, the above is given as an exemplification in that for a phenyl-containing polysiloxane oil having a viscosity varying from anywhere from 50 to 10,000 centipoise at 25° C and having a phenyl-content of 0.5 to 40 mole percent that such polysiloxane can be added to the composition at a concentration of anywhere from 0.5 to 30 parts by weight based on 100 parts by weight of the base silanol end-stopped diorganopolysiloxane polymer. It can be appreciated that if such phenyl-containing oil has a larger phenyl content than as specified above then it can be utilized at lower concentrations as described previously and that if it has a lower phenyl content than as specified above it can be utilized at higher concentrations in the instant composition than as specified above. The only result from such addition outside the above limits is that too much of such phenyl-containing polysiloxane cannot be utilized in the instant composition since if too much is utilized as a diluent the physical properties of the cured silicone elastomer will not be at the desired level.

In addition to containing a certain amount of phenyl substitution, such polysiloxane oil, must contain a certain amount of unsaturation and preferably contain a vinyl unsaturation of anywhere from 0.01 to 10 mole percent, such vinyl unsaturation or phenyl unsaturation in such phenyl-containing polysiloxanes being present if there is not sufficient vinyl concentration in the base diorganopolysiloxane polymer or if there is not sufficient vinyl concentration in the cross-linking agent of Formula 1 above. Production of such phenyl and vinyl containing polysiloxane oils is well within the above viscosity range as is well known in the art and as such will not be described below.

Finally, if the polysiloxane oil additive is not present or is present and does not contain any vinyl unsaturation and if the cross-linking agent does not contain the appropriate vinyl concentration and finally the base silanol end-stopped base polysiloxane polymer does not contain sufficient vinyl unsaturation to obtain the optimum self-extinguishing properties, then there may be added to the composition a resinous copolymer containing vinyl unsaturation. Accordingly, in one instance, for a specific formulation to obtain certain self-extinguishing and physical properties in the cured elastomer, there may be optionally present in the compositions of the instant case from 0.5 to 20 parts by weight of a resinous copolymer of $R_3^{10}SiO_{0.5}$ and $SiO_2$ units in a weight ratio of .5:1 to 1:1 where $R^{10}$ is selected from the class consisting of alkyl radicals, aryl radicals and alkenyl radicals of 1 to 8 carbon atoms wherein from 5 to 33 mole percent of such $R^{10}$ radicals are vinyl radicals. In place of or in addition to the above resin there may be utilized a resin having $R^{10}SiO_{1.5}$ units and $SiO_2$ units in a weight ratio of 1:0 to 1:1 where $R^{10}$ is as defined previously and wherein 30 to 100 mole percent of the $R^{10}$ groups are vinyl, such resins can contain hydrocarbonoxy functionality of 1 to 15 weight percent. Such a resin may be present at a concentration of 0.1 to 20 parts by weight of 100 parts of the base polymer. Such vinyl-containing resins may function as an additional cross-linking agent to the alkoxy functional silane or Formula 1 above. More preferably, there is added at a concentration of 0.5 to 10 parts by weight based on 100 parts of the silanol end-stopped diorganopolysiloxane base polymer, one of the above resins. Such an ingredient must be added with the above specified vinyl content and at the foregoing concentrations based on the base silanol polymer in the one-component room temperature vulcanizable silicone rubber composition of the instant case if it is desired that the cured silicone elastomer have the desired vinyl content such that the composition has the optimum self-extinguishing properties, in the case when it is desired not to introduce vinyl unsaturation in the cross-linking agent of Formula 1 or to introduce vinyl unsaturation in the base diorganopolysiloxane base polymer of the instant composition. It should be noted that vinyl containing resins are basically additives to maximize the self-extinguishing properties. Accordingly, it will not be necessary to discuss the preparation and use of such resin in the present one-component system more fully since the preparation of such resins are known to a worker skilled in the art. Suffice to state, that the resinous copolymer may be introduced into the instant composition in the foregoing concentration if it is desired to add additional vinyl unsaturation to the composition or to introduce basic vinyl unsaturation into the composition and also for the purpose of tailoring the physical properties of the cured elastomer. Finally, there may be added any other optional ingredients in the instant composition when it is desired to optimize the composition for a certain application such that it has the self-extinguishing properties noted above and also have other desirable physical properties. For instance, to make the composition self-bonding there may be introduced from 0.5 to 10 parts by weight of the base silanol end-stopped diorganopolysiloxane polymer of a silyl isocyanurate self-bonding additive. Silyl isocyanurate self-bonding additives are, for instance those disclosed in Berger, U.S. Pat. No. 3,821,218, which is hereby incorporated into the present case by reference. Other self-bonding additives as desired, or a catalyst that does not affect the self-extinguishing properties of the composition may be added to the titanium chelate catalyst set forth above to further enhance the physical properties or bonding properties of the composition.

The one-component composition is simply prepared by mixing all the ingredients in any order desired. More specifically it is necessary to incorporate the carbon black and then the fillers (both the metal oxide fillers and the standard reinforcing fillers) into the base silanol end-stopped polymer, then platinum and followed by the cross-linking agent and titanium chelate catalyst and/or any additional optional additives are mixed into the composition. Specifically, such mixing is carried out at least before the addition of the titanium chelate catalyst and the cross-linking agent with a drying cycle so as to have the composition after the catalyst and cross-linking agent have been mixed to is in an essentially anhydrous state. After the catalyst and all the other ingredients have been mixed into the composition, the composition is packaged and stored in an anhydrous state. When it is desired to cure the composition, it is simply applied and then the composition cures in the presence of atmospheric moisture to a silicone elastomer. Usually the composition will set over a period of time of anywhere from 10 minutes to 5 hours and will finally cure to its final cured state in a period of time varying anywhere from 24 to 72 hours. The instant composition is advantageously packaged in caulking tubes or squeeze tubes so that it can be applied to whatever encapsulating function it is desired and it will cure in the presence of atmospheric moisture to a silicone elastomer with the desired physical properties and also have the desired self-extinguishing properties. It should be noted that with the exception of the metal oxide filler concentration, the concentration of the carbon black and the concentration of the platinum and vinyl content that the concentration of all the other ingredients set forth in the instant composition are just given as a guide to a worker skilled in the art, and that these concentrations are not meant to be critical and can vary at will to obtain the optimum physical properties for a particular application of a composition and to obtain the desired self-extinguishing properties for the instant composition. Also, the phenyl concentration in the one-component compositions of the instant case is set forth above as a guide.

The following examples are given for the purpose of illustrating the reduction to practice of the instant invention. They are not given for any purpose in defining the scope and limits of the instant specification and claims. All parts in the examples are by weight. In determining the self-extinguishing properties of the compositions set forth in the examples below, there was used the evaluation procedure set forth in the Underwriter's Laboratory Bulletin No. 55. The test provides that there be a special cabinet with bunson burners, similar to Fisher 3962, two stop watches graduated to read 2.1 seconds, and untreated surgical cotton. Samples that are prepared may be in the size of ½ inch × 2 inches × 1/16 inch thick or a strip ½ inch × 2½ inches × ⅛ inch thick. In the procedure the two stop watches are set to zero and placed nearby the bunson burner. The test specimen is supported from an upper end with a long dimension vertical and the lower end of the specimen must be ⅜ inch above the top of the burner and 12 inches above the floor of the cabinet. Then there is placed small pad of untreated cotton fibers on the floor of the cabinet directly below the specimen. The burner is ignited adjusted to a blue flame ⅜ inch high. Then the burner is slid under the lower end of the test specimen at the same time the stop watch number one is begun. Then the burner is withdrawn after ten seconds. Immediately thereafter the time of duration of the burning or glowing of the specimen with stop watch number two is measured. The time duration of the burning or glowing is then recorded in seconds as the self-extinguishing time. Then the sample specimen is reignited as before and the glowing or burning time is again determined. If the specimen drips flamed particles which ignites the cotton pad twelve inches below, this is recorded on the test form. Five specimens are tested by this technique and an average burning time is obtained to the nearest .1 second. A sample is considered to be self-extinguishing in accordance with this test if the average burning time does not excees 25 seconds and no single value of burning is greater than 30 seconds and no flamed particles ignited the cotton pad twelve inches below the specimen.

EXAMPLE 1

There was mixed into 100 parts by weight of a 10,000 centipoise viscosity silanol-terminated dimethylpolysiloxane, 37.0 parts of 5 micron quartz, 7.0 parts of fumed silica, 3.0 parts of methoxy-terminated methylphenylsiloxane oil having a viscosity of 40cs. having a methoxy content of 7 weight percent and having a phenyl content of 30 mole percent, 2.0 parts of fine thermo carbon black having a particle size 1400 Angstroms, 0.5 parts of zinc oxide, 0.05 parts of the foregoing Karstedt platinum catalyst having a concentration of 1.8 weight percent platinum metal in a solution with excess methylvinyl tetramer being present which ingredients were very thoroughly mixed into each other. To 700 parts of the above base composition there was then added 47.25 parts of the catalyst solution which was prepared by mixing 29.4 parts by weight of vinyl triethoxysilane and 17.85 parts by weight of 1,3-propanedioxytitanium-bis-ethylacetylacetate. The mixing was carried out in the absence of air and atmospheric moisture and packaged in 6 oz. polyethylene Semco tubes. The material was then allowed to chemically equilibrate for three days. Tests sheets were then prepared and allowed to cure at 77 ± 2 F and 50 ± 5% relative humidity for 7 days. This composition when it was tested with the test as set forth in the Underwriter's Laboratory Bulletin No. 55 was self-extinguishing as defined above.

EXAMPLE 2

There was prepared a base composition comprised of 100 parts by weight of a 2500 centipoise viscosity silanol-terminated linear dimethylpolysiloxane polymer, 10 parts by weight of a dimethylvinyl-terminated dimethyl and diphenylsiloxane copolymer having a viscosity of 600 centipoise at 25° C and a dimethylvinyl siloxy concentration of 1.1 mole percent and a diphenylsiloxy content of 8 mole percent, 40 parts by weight of 5 micron quartz, 25 parts by weight of fumed silica filler, 2.5 parts of fine thermo carbon black having a size 1400 Angstroms, .5 parts by weight of zinc oxide and 1.75 parts by weight of a platinum complex. Then there was prepared a catalyst solution comprised of 4.0 parts of vinyltrimethoxy silane and 2.55 parts of 1,3-propanedioxy titanium-bis-ethylacetyl-acetate titanium chelate catalyst. To 700 parts of the base composition by weight there was added 47.25 parts of the catalyst solution in the absence of air and atmospheric moisture and packaged in 6 oz. polyethylene Semco tubes. The composition was allowed to chemically equilibrate for 3 days. Then samples were then prepared and allowed to cure at 77 ± 2 F and 50 ± 5% relative humidity for seven days. This composition which was a more thixotropic material with better flow properties than the composition of Example 1, when tested in the tests set forth in the foregoing Underwriter's Laboratory Bulletin No. 55 was found to be self-extinguishing as set forth in the tests.

EXAMPLE 3

There was prepared a base compound comprising 100 parts by weight of a silanol end-stopped dimethylpolysiloxane of 2,500 centipoise viscosity; 10 parts by weight of a dimethylvinyl siloxy terminated diphenyl, dimethyl copolymer fluid containing 8 mole percent diphenylsiloxy and 1.1 mole percent of dimethylvinylsiloxy and having a viscosity of 600 centipoise at 25° C; 6.05 parts by weight of a resin composed of $CH_2 = CHSiO_{3/2}$ units and a methoxy content of 8 weight percent; 25 parts by weight of fumed silica; 40 parts by weight of 5 micron quartz; 2.5 parts of carbon black; 0.5 parts by weight of zinc oxide; and 0.310 parts by weight of a platinum complex catalyst solution containing 1.8% platinum.

There was then prepared a catalyst mixture composed of 3.0 parts by weight of methyltrimethoxysilane 1.8 parts of 1,3,propanedioxy titanium bis-(ethylacetylacetate) and 0.75 parts by weight of 1,3,5 tris-trimethoxy-silylpropyl isocyanurate. Then 100 parts of the base compound was catalyzed with 5.55 parts of the catalyst mixture. The composition was then packaged in Semco tubes and allowed to stand for 3 days. Then ASTM Sheets were prepared as in Example 1 and after seven days of cure at 77° F and 50% Relative Humidity the sheets were treated for self-extinguishing properties. When the cured sheets were subjected to the tests in Underwriter's Laboratory Bulletin No. 55 the cured sheets were found to be self-extinguishing.

We claim:

1. A self-extinguishing room temperature vulcanizable silicone rubber composition comprising (a) 100 parts of a silanol end-stopped diorganopolysiloxane having a viscosity varying from 100 to 500,000 centipoise at 25° C where the organo groups are monovalent hydrocarbon radicals; (b) from 5 to 200 parts by weight of a filler selected from reinforcing and extending fillers; (c) from 0.1 to 10 parts by weight of a metal oxide filler; (d) from 1 to 15 parts by weight of a cross-linking agent having the formula, $$R\ SI\ (OR^1)_3$$

where R and $R^1$ are monovalent hydrocarbon radicals; (e) from 0.5 to 10 parts by weight of carbon black; (f) from 1 to 100 parts per million of platinum; and (g) from 0.01 to 5 parts by weight of a titanium chelate catalyst wherein the composition must contain from 0.01 to 10 mole percent of vinyl substitution based on the silanol end-stopped polymer.

2. The composition of claim 1 wherein in ingredient (a) there is present from 0.5 to 20 mole percent of phenyl substituent groups.

3. The composition of claim 1 wherein there is additionally present from 0.5 to 30 parts by weight of a polysiloxane having a viscosity varying from 50 to 10,000 centipoise at 25° C, which may have as terminal groups, radicals selected from the class consisting of alkoxy radicals, alkyl radicals and alkyl-alkenyl containing radicals of 1 to 8 carbon atoms and wherein the other substituent groups in the polysiloxane are selected from methyl, phenyl and vinyl wherein there is present in said polymer from 0.5 to 40 mole percent of phenyl.

4. The composition of claim 1 wherein the metal oxide filler is zinc oxide.

5. The composition of claim 1 wherein (a) has the formula,

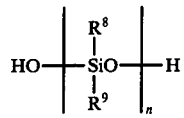

wherein $R^8$ and $R^9$ are selected from the class consisting of alkyl, aryl and alkenyl radicals of 1 to 8 carbon atoms, wherein up to 20 mole percent of $R^8$ and $R^9$ can be aryl groups and up to 10 mole percent can be alkenyl and n varies from 10 to 1700.

6. The composition of claim 1 wherein in ingredient (d) R and $R^1$ are selected from the class consisting of alkyl radicals, aryl radicals and alkenyl radicals of 1 to 8 carbon atoms.

7. The composition of claim 6 wherein R is vinyl and $R^1$ is methyl.

8. The composition of claim 1 wherein there is present from 5 to 50 parts by weight of a reinforcing filler and from 10 to 150 parts by weight of an extending filler.

9. The composition of claim 8 wherein the reinforcing filler is selected from the class consisting of fumed silica and precipitated silica.

10. The composition of claim 1 wherein the titanium chelate catalyst has the formula,

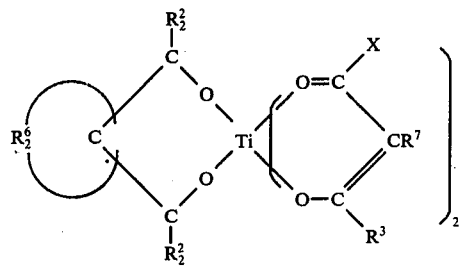

wherein $R^2$ is a radical selected from the group consisting of hydrogen, hydrocarbyl having not more than about 8 carbon atoms, carboxyalkyl and having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, and cyano lower alkyl, $R^6$ is selected from the same group as $R^2$, cyano, nitro, carboxy ester, acyl and hydrocarbyl substituted by cyano, nitro, carboxy ester and acyl, $R^7$ is selected from the group consisting of hydrogen, hydrocarbyl having not more than about 8 carbon atoms, acyl having not more than about 8 carbon atoms, and taken together with $R^3$ forms together with the carbon atoms to which they are attached cyclichydrocarbon substituents of not more than about 12 carbon atoms and nitro, acyl, cyano, and carboxy ester substituted cyclichydrocarbon substituents; X is a radical selected from the class consisting of radicals having not more than about 8 carbon atoms selected from the group consisting of hydrocarbyl, cyanoalkyl, alkoxy, cyanoalkoxy and amino, o has a value of 0 to 8, and such that when o is zero the

moieties are bonded to each other in a cyclic fashion.

11. The composition of claim 10 wherein the titanium chelate catalyst has the formula,

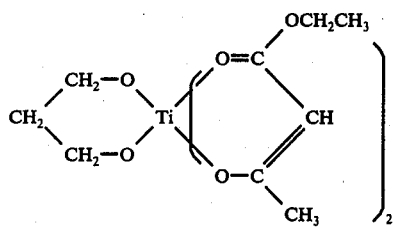

12. The composition of claim 1 wherein there is present from 0.5 to 20 parts by weight of a resinous copolymer of $R_3^{10} SiO_{0.5}$ units and $SiO_2$ units in a weight ratio of 0.5:1 to 1:1 and $R^{10}$ is selected from the class consisting of alkyl radicals, aryl radicals and alkenyl radicals of 1 to 8 carbon atoms, wherein there is present from 5 to 33 mole percent of alkenyl radicals.

13. The composition of claim 1 wherein there is present from 0.5 to 10 parts by weight of a self-bonding additive which is a silyl isocyanurate compound.

14. A process for forming a self-extinguishing room temperature vulcanizable silicone rubber composition comprising (1) mixing (a) 100 parts by weight of a silanol end-stopped diorganopolysiloxane having a viscosity varying from 100 to 500,000 centipoise at 25° C where the organo groups are monovalent hydrocarbon radicals (b) from 5 to 200 parts by weight of a filler selected from reinforcing and extending fillers; (c) from 0.1 to 10 parts by weight of a cross-linking agent having the formula, R Si (OR$^1$)$_3$ where R and R$^1$ are monovalent hydrocarbon radicals (e) from 0.5 to 10 parts by weight of carbon black; (f) from 1 to 100 parts by weight per million of platinum; and (g) from 0.01 to 5 parts of a titanium chelate catalyst, wherein the composition must contain from 0.01 to 10 mole percent of a vinyl substitution based on the silanol end-stopped polysiloxane.

15. The process of claim 14 wherein in ingredient (a) there is present from 0.5 to 20 mole percent of phenyl substituent groups.

16. The process of claim 14 wherein there is additionally present from 0.5 to 30 parts by weight of a polysiloxane having a viscosity varying from 50 to 10,000 centipoise at 25° C which may have as terminal groups radicals selected from the class consisting of alkoxy radicals, alkyl radicals and alkyl-alkenyl radicals containing radicals of 1 to 8 carbon atoms and wherein the other substituent groups in the polysiloxane are selected from methyl, phenyl and vinyl wherein there is present in said polysiloxane from 0.5 to 40 mole percent of phenyl.

17. The process of claim 14 wherein the metal oxide filler is zinc oxide.

18. The process of claim 14 wherein (a) has the formula,

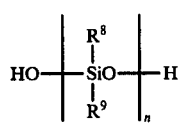

wherein R$^8$ and R$^9$ are selected from the class consisting of alkyl, aryl and alkenyl radicals of 1 to 8 carbon atoms wherein up to 20 mole percent of R$^8$ and R$^9$ can be aryl radicals and up to 10 mole percent can be alkenyl and n varies from 10 to 2000.

19. The process of claim 14 wherein in ingredient (d) R and R$^1$ are selected from the class consisting of alkyl radicals, aryl radicals and alkenyl radicals of 1 to 8 carbon atoms.

20. The process of claim 19 wherein R is vinyl and R$^1$ is methyl.

21. The process of claim 14 wherein there is present from 5 to 50 parts by weight of a reinforcing filler and from 10 to 150 parts by weight of an extending filler.

22. The process of claim 21 wherein the reinforcing filler is selected from the class consisting of fumed silica and precipitated silica.

23. The process of claim 14 wherein the titanium chelate catalyst has the formula,

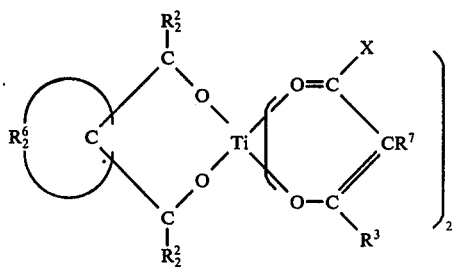

wherein R$^2$ is a radical selected from the group consisting of hydrogen, hydrocarbyl having not more than about 8 carbon atoms, carboxyalkyl and having not more than about 8 carbon atoms and the total number of carbon atoms in the R$^2$ and R$^6$ substituted alkanedioxy radical is not more than about 18, R$^3$ is a radical having not more than about 8 carbon atoms selected from the group consisting of hydrocarbyl,
and cyano lower alkyl, R$^6$ is selected from the same group as R$^2$ cyano, nitro, carboxy ester, acyl and hydrocarbyl substituted by cyano, nitro, carboxy ester and acyl, R$^7$ is selected from the group consisting of hydrogen, hydrocarbyl having not more than about 8 carbon atoms, acyl having not more than about 8 carbon atoms, and taken together with R$^3$ forms together with the carbon atoms which they are attached cyclichydrocarbon substituents of not more than about 12 carbon atoms and chloro, nitro, acyl, cyano, and carboxy ester substituted cyclichydrocarbon substituents; X is a radical selected from the class consisting of radicals having not more than about 8 carbon atoms selected from the group consisting of hydrocarbyl, halo-hydrocarbyl, cyanoalkyl, alkoxy, haloalkoxy, cyanoalkoxy and amino, m has a value of 0 to 3 and an average value based upon the total amount of silane in the composition of 0 to 1.99, o has a value of 0 to 8, and such that when o is zero the

moieties are bonded to each other in a cyclic fashion.

24. The process of claim 23 wherein the titanium chelate catalyst has the formula,

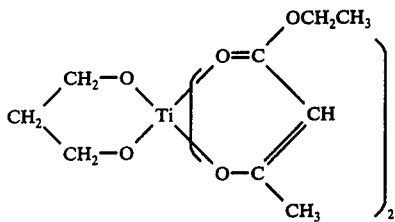

25. The process of claim 14 wherein there is present from 0.5 to 20 parts by weight of a resinous copolymer of $R_3^{10}SiO_{0.5}$ units and $SiO_2$ units in a weight ratio of 0.5:1 to 1:1 and $R^{10}$ is selected from the class consisting of alkyl radicals, aryl radicals and alkenyl radicals of 1 to 8 carbon atoms, wherein there is present from 5 to 33 mole percent of alkenyl radicals.

26. The process of claim 14 wherein there is present from 0.5 to 10 parts by weight of a self-bonding additive which is a silyl isocyanurate compound.

27. The composition of claim 1 wherein there is present from 0.5 to 20 parts by weight of a resinous copolymer of $R^{10}SiO_{3/2}$ units and $SiO_2$ units in a weight ratio of 1:0 to 1:1 where $R^{10}$ is selected from the class consisting of alkyl radicals, aryl radicals and alkenyl radicals of 1 to 8 carbon atoms, wherein there is present from 5 to 33 mole percent of alkenyl radicals.

28. The process of claim 14 wherein there is present from 0.5 to 20 parts by weight of a resinous copolymer of $R^{10}SiO_{3/2}$ units and $SiO_2$ units in a weight ratio of 1:0 to 1:1 where $R^{10}$ is selected from the class consisting of alkyl radicals, aryl radicals and alkenyl radicals of 1 to 8 carbon atoms wherein there is present from 5 to 33 mole percent of alkenyl radicals.

* * * * *